(12) United States Patent
Murakami (10) Patent No.: US 6,459,979 B2
(45) Date of Patent: Oct. 1, 2002

(54) DRIVING FORCE CONTROL SYSTEM FOR A VEHICLE

(75) Inventor: Kenichiro Murakami, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/838,154

(22) Filed: Apr. 20, 2001

(30) Foreign Application Priority Data

Jun. 7, 2000 (JP) ........................................ 2000-170382

(51) Int. Cl.$^7$ ................................................ G06F 7/00
(52) U.S. Cl. .............................. 701/54; 701/52; 701/61; 701/64
(58) Field of Search .............................. 701/54, 51, 52, 701/61, 64; 477/34, 46, 107, 110

(56) References Cited

U.S. PATENT DOCUMENTS

| | | | |
|---|---|---|---|
| 4,559,599 A | * 12/1985 | Habu et al. | ............... 364/424.1 |
| 4,868,753 A | 9/1989 | Mori | |
| 5,188,435 A | 2/1993 | Willmann | |
| 5,303,153 A | * 4/1994 | Sakai et al. | ............... 364/424.1 |
| 6,029,107 A | * 2/2000 | Sato | ............................. 701/58 |

FOREIGN PATENT DOCUMENTS

| JP | 3-129165 A | 6/1991 |
|---|---|---|
| JP | 4-260853 A | 9/1992 |

* cited by examiner

Primary Examiner—Yonel Beaulieu
(74) Attorney, Agent, or Firm—Shinjyu Global IP Counselors, LLP (57) ABSTRACT

The driving force control system calculates a target driving force Tt* and then calculates a target engine torque Te* from a target driving force Tt* and a target calculated engine torque gear ratio. When the transmission is not shifting, the driving force control system uses a gear ratio determined by the gear position as the target calculated engine torque gear ratio. When the transmission is shifting, the driving force control system uses an actual gear ratio calculated from the input and output rotational speeds. This gear ratio switching control makes it possible to vary the target engine torque Te* gradually in response to the change of the actual gear ratio during shifting. Thus, a dip in the output torque is eliminated, and the shifting shock is mitigated to a satisfactory level.

8 Claims, 6 Drawing Sheets

DRIVING FORCE CONTROL SYSTEM FOR A VEHICLE

BACKGROUND OF THE INVENTION

1. Field of the Invention

The present invention generally relates to a driving force control system for a vehicle. More specifically, the present invention relates to a system that controls the driving force in a vehicle equipped with a step-type automatic transmission.

2. Background Information

One known driving force control system for controlling the driving force of a vehicle is disclosed in Japanese Laid-Open Patent Publication No. 4-260853. The driving force control system disclosed in this publication determines a target driving force of a vehicle based on the vehicle speed and the driver's operation of the accelerator pedal. Accordingly, the driving force control system controls the gear position and the engine torque so as to achieve the target driving force. The engine torque is set for delivering the target driving force established for each gear position by using a chart that provides the amount of throttle opening required. During shifting of the gear, the timings are controlled in view of the response of each control operation. The timings are controlled such that the gear position and the throttle opening are changed at the same time. The timings are controlled such that the start of actual shifting of the transmission and opening of the electronically controlled throttle are synchronized. In this manner, a shock during the shifting can be reduced.

However, when the engine torque is changed at the beginning of an actual shifting operation, such problems as clutch slippage (when torque is being increased) and sudden clutch engagement (when torque is being reduced) can occur easily. As a result, the shifting operation may be delayed or the shifting shock may be worsened. These situations occur because the clutch is unstable at the beginning of the inertia phase of the shifting operation. Accordingly, the balance between clutch capacity and input torque can easily be disrupted.

If the system changes the engine torque at the end of the shifting operation to avoid the aforementioned problems, the change in the engine torque causes an additional effect on the output torque. More specifically, the aim of increasing the engine torque Te at the end of the upshifting operation is to eliminate the sudden decrease in the output torque To. However, if the target engine torque is changed towards the end of the shifting operation in an attempt to eliminate the sudden change in the driving force that occurs before and after the shifting operation, a dip in the output torque To will occur. This is due to a delay in increase of the actual engine torque Te. This delay occurs due to the delay in the control of the electronically controlled throttle. As a result, this dip in the output torque To causes the shifting shock.

In other words, this kind of phenomenon will occur even if the engine torque is controlled so as to change near the end of the shift operation. Therefore, it is preferable to avoid the disadvantageous phenomenon mentioned above when controlling the driving force to achieve the calculated target driving force. Furthermore, it is preferred that the measure for avoiding the phenomenon be more effective in controlling the driving force in a suitable manner.

Additionally, during an upshifting operation in accordance with conventional technology, the gear ratio is shifted toward a higher gear position either because the driver returned his foot to the accelerator, or because a gear ratio abnormality occurred when the target engine torque was being calculated based on the actual gear ratio. If the actual gear ratio calculated from the input and output speeds is solely used in calculating the target engine torque based on the target driving force, then the target engine torque will increase more than necessary. Accordingly, the shifting shock, which is a sharp increase in the output torque, will worsen if the calculated actual gear ratio shifts toward a higher gear position due to an apparent change in the actual gear ratio. This apparent increase in the actual gear ratio is caused by OWC (one-way clutch) release due to the driver's foot returning to or releasing from the accelerator pedal during shifting or due to a sensor abnormality. In particular, since the target engine torque equals the target driving force divided by the gear ratio, the target engine torque could possibly reach the maximum if the gear ratio keeps decreasing as indicated by the arrow and results in an extremely small value. Accordingly, the output torque undergoes a sharp rise because the hydraulic pressure increases in response to the increase in the engine torque.

In view of the above, there exists a need for a driving force control system, which overcomes the above-mentioned problems in the prior art. This invention addresses this need in the prior art as well as other needs, which will become apparent to those skilled in the art from this disclosure.

SUMMARY OF THE INVENTION

The object of the present invention is to provide a driving control system that achieves shift operations without worsening shift shocks.

The aforementioned object can be attained by providing a driving force control system for a vehicle with a step-type automatic transmission. The vehicle driving force control system basically includes a target driving force calculating section, a gear ratio determining section, and a target engine force calculating section. The target driving force calculating section is configured to calculate a target driving force. The gear ratio determining section is configured to determine a calculated engine torque gear ratio based on a current gear position when shifting is not occurring, and based on an actual gear ratio calculated from input and output rotational speeds at least at one point in time during shifting. The target engine force calculating section is configured to calculate a target engine torque based on the target driving force and the calculated engine torque gear ratio.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention are provided for illustration only, and not for the purpose of limiting the invention as defined by the appended claims and their equivalents.

Figure 1:
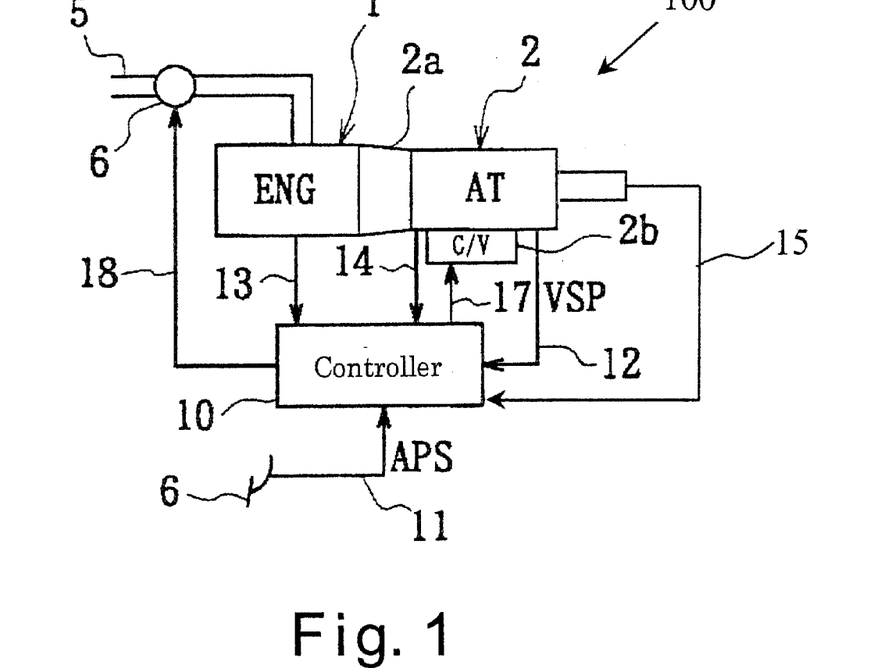
FIG. 1 is a block diagram illustrating a driving force control system in accordance with one embodiment of the present invention.

Referring to FIG. 1, a driving force control system 100 is illustrated in accordance with the first embodiment of the present invention. The driving force control system 100 is operatively coupled to an engine 1 and an automatic transmission 2 of a vehicle to aid in the shifting operation of the vehicle.

As explained below in more detail, the driving force control system 100 calculates a target driving force Tt* and then calculates a target engine torque Te* from a target driving force Tt* and a calculated engine torque gear ratio. When the automatic transmission 2 is not shifting, the driving force control system 100 uses a gear ratio determined by the gear position as the calculated engine torque gear ratio. When the automatic transmission 2 is shifting, the driving force control system 100 uses an actual gear ratio calculated from the input and output rotational speeds to calculate the calculated engine torque gear ratio. This gear ratio switching control makes it possible to vary the target engine torque Te* gradually in response to the change of the actual gear ratio during shifting. Thus, a dip in the output torque is eliminated, and the shifting shock is mitigated to a satisfactory level.

Figure 2:
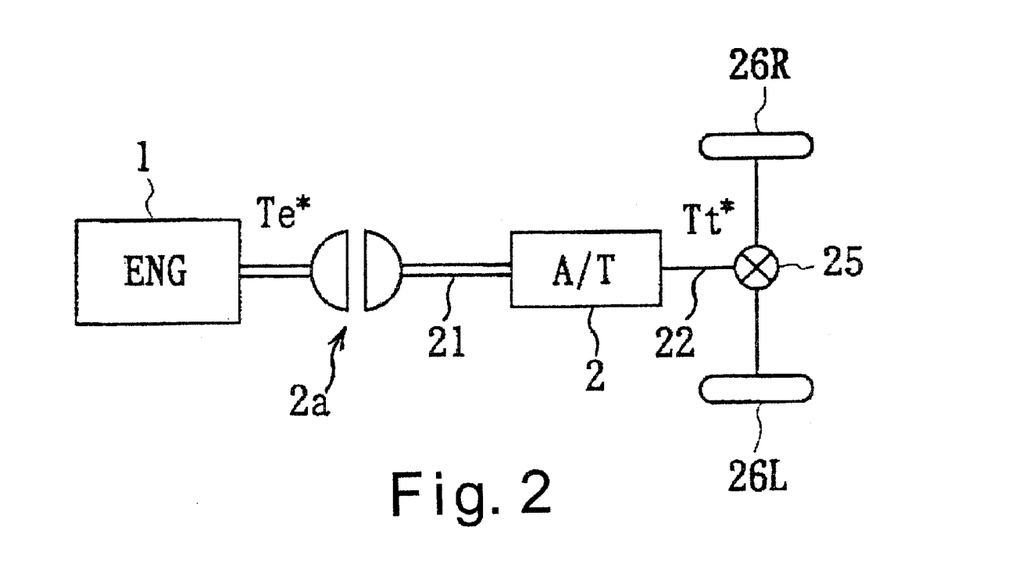
FIG. 2 is a block diagram of a power train utilizing the driving force control system of the present invention.

Referring to FIG. 1, the driving force control system 100 includes a controller 10 that is operatively coupled to the engine 1, the automatic transmission 2, an acceleration pedal 6, and a throttle value 7. FIG. 2 shows an example of the power train of the vehicle in which the driving force control system 100 of the present embodiment is utilized. In the driving force control system 100, the engine 1 and the automatic transmission 2 are connected via an input shaft 21 with a torque converter 2a that is disposed therebetween. The automatic transmission 2 is further connected to a differential gear 25 via an output shaft 22.

Referring back to FIG. 1, the controller 10 is operatively coupled to the engine 1 by receiving a signal 13 therefrom. The controller 10 is also operatively coupled to the automatic transmission 2 for receiving a pair of signals 12 and 14 therefrom and for sending a signal 17 to a control valve 2b of the automatic transmission 2. Furthermore, the controller 10 is operatively coupled to the acceleration pedal 6 for receiving a signal 11 therefrom. Additionally, the controller 10 is coupled to the throttle device 7 for sending a signal 18 thereto.

The engine 1 is an engine system having a device that electronically controls the throttle valve 7. The automatic transmission 2 that is driven by the engine 1 is a conventional step-type automatic transmission whose gear ratio is controlled in response to an accelerator pedal depression amount APS (accelerator pedal stroke) and a vehicle speed VSP.

The throttle device 7 is provided in an intake pipe or passage 5 of the engine 1. The throttle device 7 is preferably an electronically controlled throttle valve. Therefore, the opening of the throttle valve 7 is preferably controlled electronically. The electronically controlled throttle device 7 is preferably a throttle valve, in which a throttle actuator is used to control the throttle valve opening value TVO based on the depression amount APS of the accelerator pedal 6.

The throttle actuator opens and closes the throttle valve 7 in order to control and regulate the engine intake air flow (engine control). Preferably, the throttle actuator of the throttle valve 7 includes a throttle motor that is electrically driven and controlled. A motor driving circuit drives the throttle motor. Also, the rotation of the throttle motor is transmitted to the throttle valve 7 in order to rotate the throttle valve, and thus, control the throttle valve opening value TVO.

Since engines, automatic transmissions, control valves, torque converters, throttle valves, throttle actuators and acceleration pedals are well known structures, the structures and functions of the engine 1, the automatic transmission 2, the control valve 2b, the torque converter 2a, the throttle valve, the throttle actuator and the acceleration pedal 6 would be obvious to those skilled in the art without further explanation herein.

Referring again to FIG. 2, the torque generated by the engine 1 is transmitted to the input shaft 21 of the automatic transmission 2. Preferably, the rotational power from the engine 1 is transmitted to the input shaft 21 through the torque converter 2a. Then, the automatic transmission 2 converts the input rotation using a gear ratio corresponding to the selected gear position, and transmits the rotation to the output shaft 22. From there, the rotation is transmitted through a differential gear position 25 to rotate the drive wheels 26R and 26L, which in turn drive the vehicle.

In FIG. 1, the controller 10 represents a comprehensive controller that controls both the engine 1 and the automatic transmission 2. The controller 10 controls the automatic transmission 2 and the engine 1 having an electronically controlled throttle device 7. Accordingly, the controller 10 of this embodiment is provided with an engine controller section or unit (ECM: engine control module) that serves as a control unit for controlling the engine 1, and an automatic transmission controller section or unit for controlling the automatic transmission 2 (ATCU: automatic transmission control unit). The engine controller section also includes a throttle valve controller section that serves as a throttle controller for controlling throttle valve opening value TVO through the electronically controlled throttle device 7.

Additionally, it will be apparent to those skilled in the art from this disclosure that these controllers can be provided separately or as a single integrated unit.

The automatic transmission 2 preferably includes the torque converter 2a, a shifting mechanism, various frictional elements such as a clutch and brake (band brake), and a control valve (C/V) 2b. The control valve 2b preferably includes a shift control hydraulic circuit, as well as a shift solenoid, a line solenoid, a lock up solenoid, and other solenoids. These solenoids are controlled by the automatic transmission controller unit of the controller 10.

In addition to input information related to engine control, several other signals are fed to the controller 10. Specifically, the controller 10 receives a signal 11 from an accelerator pedal sensor that detects the depression amount APS (accelerator operation amount) of the accelerator pedal 6. The controller 10 also receives a signal 12 from a vehicle speed sensor that detects the vehicle speed VSP. The controller 10 also receives a signal 13 from an engine speed sensor that detects the engine speed Ne. The controller 10 also receives a signal 14 from a transmission input shaft speed sensor that detects the input rotational speed of transmission the input shaft 21. The controller 10 also receives a signal 15 is from a transmission output shaft speed sensor that detects the rotational speed of transmission the output shaft 22.

The controller 10 includes a microcomputer, which is equipped with a processing circuit (CPU) and an input detection circuit for receiving input information from the related sensors. The automatic transmission controller section includes a memory circuit (RAM and/or ROM) and an output circuit that transmits control signals such as the control valve control signal 17 for driving the shift solenoid and other solenoids of the control valve 2b. The memory circuit preferably includes the following programs executed by the processing circuit: a shifting point (operating point) control program; a lockup control and slip control program that turns ON and OFF the lockup clutch or frictional element of the torque converter 2a; a basic transmission control program such as a line pressure control program for use in shifting and non-shifting situations; and other control programs. The memory circuit also stores computational results and other information. Control of the capacity of each frictional element in the automatic transmission 2 can also be included among the basic transmission controls.

The controller 10 has a shifting chart stored therein to control the shifting of the automatic transmission 2. During a shifting control, a gear position is determined based on input information regarding the vehicle speed VSP and the accelerator pedal depression amount APS resulting from the operation of the accelerator pedal 6 by the driver. The controller 10 then conducts a shifting operation to the selected gear position by turning the solenoid valves ON and OFF.

In the illustrated embodiment, the automatic transmission controller unit and the engine controller unit of the controller 10 are connected via a data transmission path so that they can communicate with each other. The engine controller unit of the controller 10 includes a microcomputer. The engine controller unit includes various conventional components such as a central processing circuit (CPU), a memory circuit (RAM and/or ROM), and an output circuit as well as other conventional components.

Engine control involves receiving inputted information from the related sensors. Engine control also involves controlling of the fuel injection executed by the fuel injection valves based on engine operating parameters such as the engine speed Ne, which is transmitted by the signal 13, so as to achieve a fuel delivery that results in the optimum fuel consumption and exhaust gas characteristics. In the meantime, other necessary engine controls are also executed. Furthermore, in this embodiment, the opening of the throttle valve is controlled through the electronically controlled throttle device 7 based on the accelerator pedal depression amount APS resulting from the driver's operation of the accelerator pedal 6 so as to achieve the targeted engine torque. Therefore, a throttle valve opening control program is stored in the aforementioned memory circuit of the engine controller unit. Also, the control signal 18, which is obtained from the execution of the programs by the CPU, is sent from the aforementioned output circuit of the engine controller unit to the electronically controlled throttle device 7.

Figure 3:
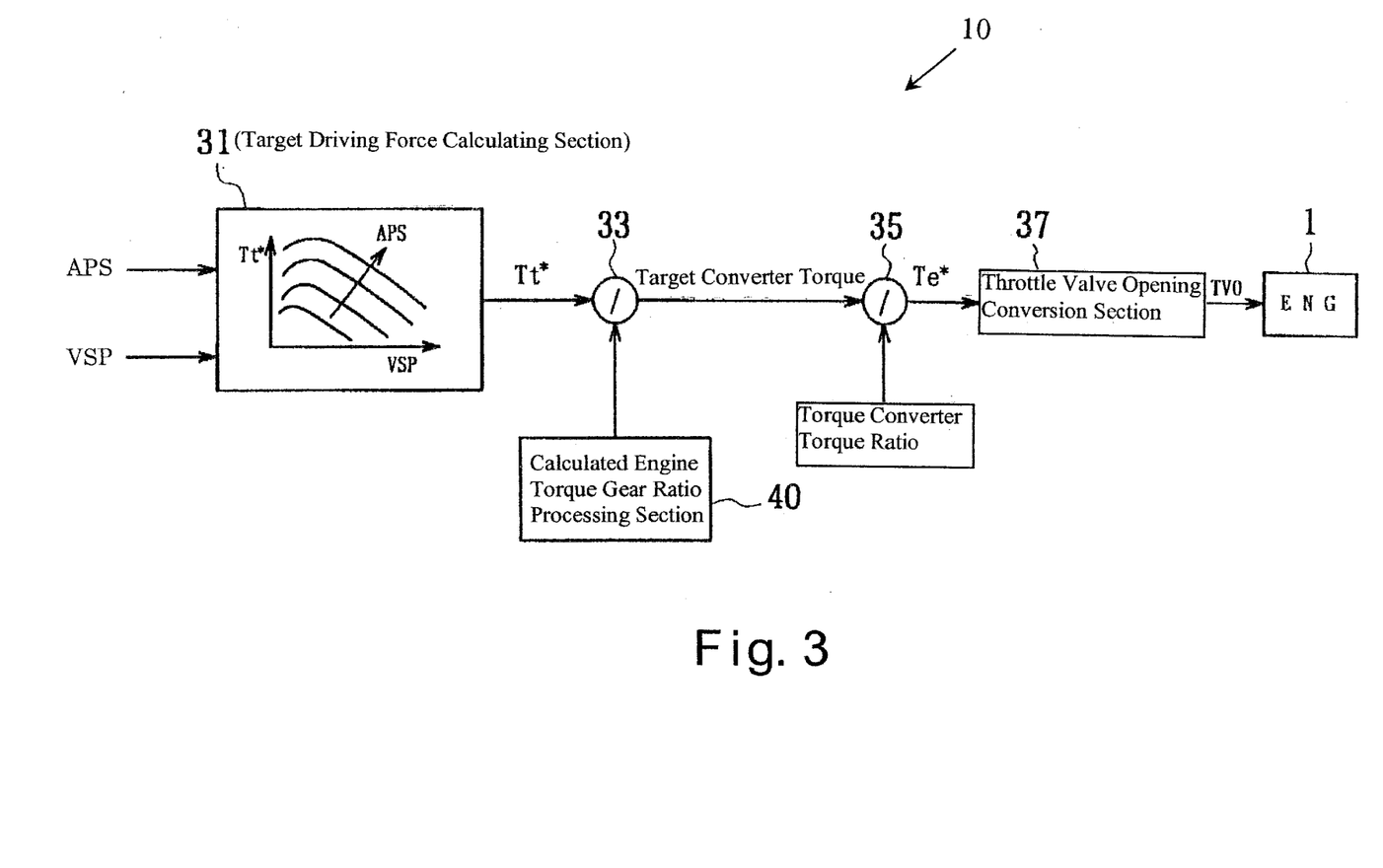
FIG. 3 is a block diagram of the overall configuration and function of the driving force control performed by the driving force control system in accordance with the present invention.

As shown in FIGS. 2 and 3, the target engine torque (indicated as "Te*" in FIGS. 2 and 3) for the engine 1 controlled by the electronically controlled throttle device 7 is calculated using the calculated engine torque gear ratio of the automatic transmission 2 and a target driving force (indicated as "Tt*" in FIGS. 2 and 3). The target driving force is obtained based on the degree to which the driver is depressing the accelerator pedal 6. The controller 10 controls the throttle valve opening value TVO so as to achieve the target engine torque.

Furthermore, the driving force control system 100 first calculates the target driving force Tt*, and then calculates the target engine torque Te* from the calculated engine torque gear ratio and target driving force Tt* as described above. In this case, the calculated engine torque gear ratio for calculating the target engine torque Te* is obtained by using the gear ratio determined by the gear position when the transmission is not shifting. Conversely, the calculated engine torque gear ratio is obtained by using an actual gear ratio calculated from the input and output rotational speeds at least at one point in time when the automatic transmission 2 is shifting. The controller 10 executes a switching operation that is necessary to accomplish this switching of the gear ratio to be used in calculation of the target engine torque Te*.

Preferably, the above described controls are executed such that the calculated value of the actual gear ratio used for calculating the target engine torque Te* is limited to a value between the gear ratio of the gear position ("current gear position") from which the gear is shifted and the gear ratio of the gear position ("next gear position") to which the gear is shifted.

Preferably, the controller 10 does not use the actual gear ratio, but uses the gear ratio determined by the gear position even during the shifting operation, until a change in the gear ratio occurs due to the start of the inertia phase.

As mentioned above, FIG. 3 is a view of functions of an example of the overall system configuration. As shown herein, the system 100 has a target driving force calculating section 31, a pair of division sections 33 and 35, a throttle valve opening conversion section 37, and an engine torque gear ratio processing section 40 that computes the gear ratio for the engine torque calculation. As will be discussed later, the engine torque gear ratio processing section 40 is preferably provided with a switching function or an engine torque calculation gear ratio switching/setting section. The switching function switches functions for calculating and processing the appropriate gear ratio. The switching function ensures that the gear ratio value to be used for calculating the target engine torque is obtained from the gear ratio determined by the gear position when the transmission 2 is not shifting, and from an actual gear ratio calculated from the input and output rotational speeds when the transmission 2 is shifting. The engine torque gear ratio processing section 40 is also provided with a function for switching between the calculated engine torque gear ratios so obtained.

The target driving force calculating section 31 calculates the target driving force Tt* of the vehicle based on the driver's depression of the accelerator pedal 6 and the vehicle speed VSP. Therefore, the target driving force calculating section 31 functions as target driving force calculating means. The target driving force calculating section 31 calculates the value of the target driving force Tt* according to the accelerator depression amount APS and vehicle speed VSP at a relevant point in time using a target driving force characteristic data chart such as the one shown in FIG. 3. The target driving force characteristic data chart is provided in advance (stored in memory) with respect to the accelerator depression amount APS and vehicle speed VSP.

Figure 4:
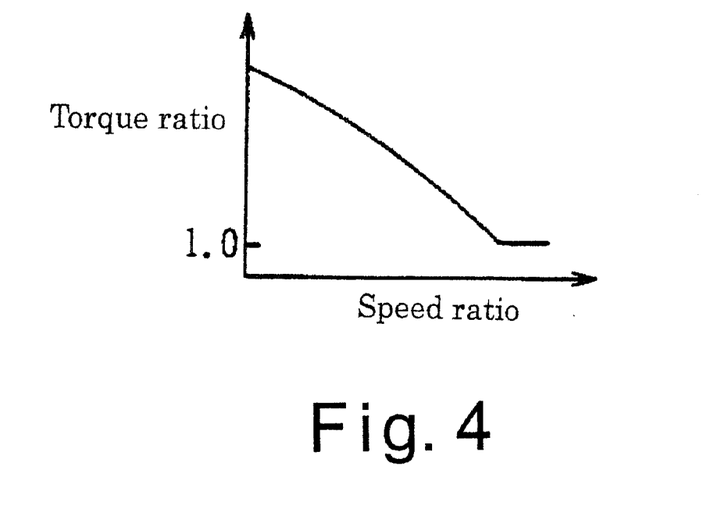
FIG. 4 is a graph showing an example of a torque ratio/speed ratio characteristic to be used in the configuration shown in FIG. 3.

The value of the target driving force Tt* can be used together with the gear ratio to compute the target engine torque, since the target engine torque is the target driving force divided by the gear ratio. However, in the example shown in FIG. 3, a target converter torque is first obtained from the target driving force Tt* calculated by the aforementioned target driving force calculation processing and the gear ratio provided by the calculated engine torque gear ratio processing section 40. On the other hand, the value of the target engine torque Te* is obtained based on the target converter torque and a torque converter torque ratio, which is determined for a speed ratio at the relevant point in time based on a torque ratio versus a speed ratio. Accordingly, the division sections 33 and 35 function as target engine force calculating means. The torque ratio versus the speed ratio such as the one shown in FIG. 4 is provided in advance (stored in memory) as shown in FIG. 4. The speed ratio is a ratio of the input rotational speed or the input shaft rotational speed to the engine rotational speed Ne.

Figure 5:
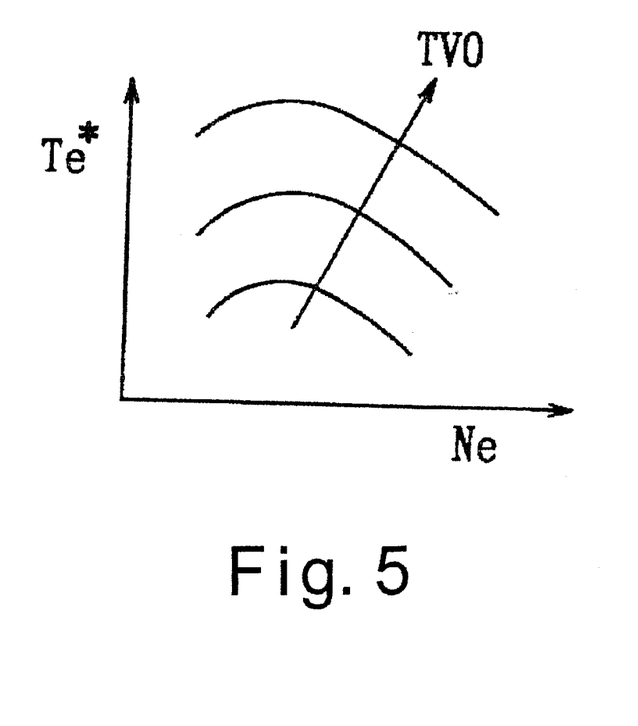
FIG. 5 is a graph showing an example of a throttle opening conversion characteristic to be used in the configuration shown in FIG. 3.

The calculated value of the target engine torque Te* is used in the computation executed by the throttle valve opening conversion section 37. The throttle valve opening conversion section 37 is a computing section that converts the target engine torque value Te* which is obtained from the aforementioned target engine torque calculation into the throttle valve opening value TVO. The throttle valve opening value TVO is the amount of throttle valve opening required for achieving the target engine torque Te*. In this manner, the aforementioned target driving force Tt* is achieved by controlling the throttle valve opening of the electronically controlled throttle device 7. In the illustrated embodiment, the value of the throttle valve opening value TVO can be determined based on the engine speed Ne of the engine 1 and the target engine torque Te* at the relevant time by using a conversion characteristic data chart such as the one shown in FIG. 5. The conversion characteristic data chart is provided in advance (stored in memory) with respect to the target engine torque Te* and the engine speed Ne.

The engine controller section of the controller 10 is able to execute the engine torque control by controlling the electronically controlled throttle device 7. Thus, the engine controller section of the controller 10 controls the opening of the electronically controlled throttle valve such that it matches the throttle valve opening value TVO obtained from the throttle valve opening conversion section 37.

Regarding the calculation of the target engine torque Te* based on the target driving force Tt* and the gear ratio obtained from the calculated engine torque gear ratio processing section 40, the calculated engine torque gear ratio processing section 40 switches the gear ratio to be used for calculating the target engine torque Te*. Thus, the calculated engine torque gear ratio processing section 40 functions as gear ratio determining means. More specifically, the calculated engine torque gear ratio processing section 40 applies an actual gear ratio calculated based on the input and output rotational speeds when the automatic transmission 2 is shifting gears, and a gear ratio determined by the gear position when the transmission 2 is not shifting.

Consequently, with the driving force control system 100 of the present invention, the engine torque control as well as the switching of the applied gear ratio can be executed by the controller 10. More specifically, when the transmission 2 is not shifting, the controller 10 uses the target driving force Tt* and the gear ratio determined by the gear position to calculate the target engine torque Te*. Then, the controller 10 controls the electronically controlled throttle device 7 so as to make the engine torque match the target engine torque Te*. Conversely, when the transmission 2 is shifting, the controller 10 uses the actual gear ratio calculated based on the input and output rotational speeds and the target driving force Tt* to calculate the target engine torque Te*. Then, the controller 10 controls the electronically controlled throttle device 7 so as to make the engine torque match the target engine torque Te*.

As a result, since the controller 10 executes engine control based on this switching of the applied gear ratio, the target engine torque value Te* can be varied gradually in response to the change of the actual gear ratio that occurs during shifting.

Therefore, a dip in the output torque can be eliminated. Accordingly, shifting shock can be mitigated.

More specifically, the controller 10, which includes the function of the engine torque gear ratio processing section 40 for computing the calculated engine torque gear ratio, is preferably configured such that the transmission controller section and the engine controller section are connected so that they can communicate each other. The comprehensive controller 10 is provided with a function that sends the actual gear ratio value to the engine controller module (ECM) for use in the automatic transmission control during shifting. As will be discussed later, when the target engine torque Te* is computed based on the actual gear ratio using the target driving force Tt* during shifting, the target engine torque Te* can be varied gradually in response to changes in the actual gear ratio. Thus, the dip in torque To can be eliminated by gradually varying the target engine torque Te*. Accordingly, the shifting shock can be mitigated.

Figure 6:
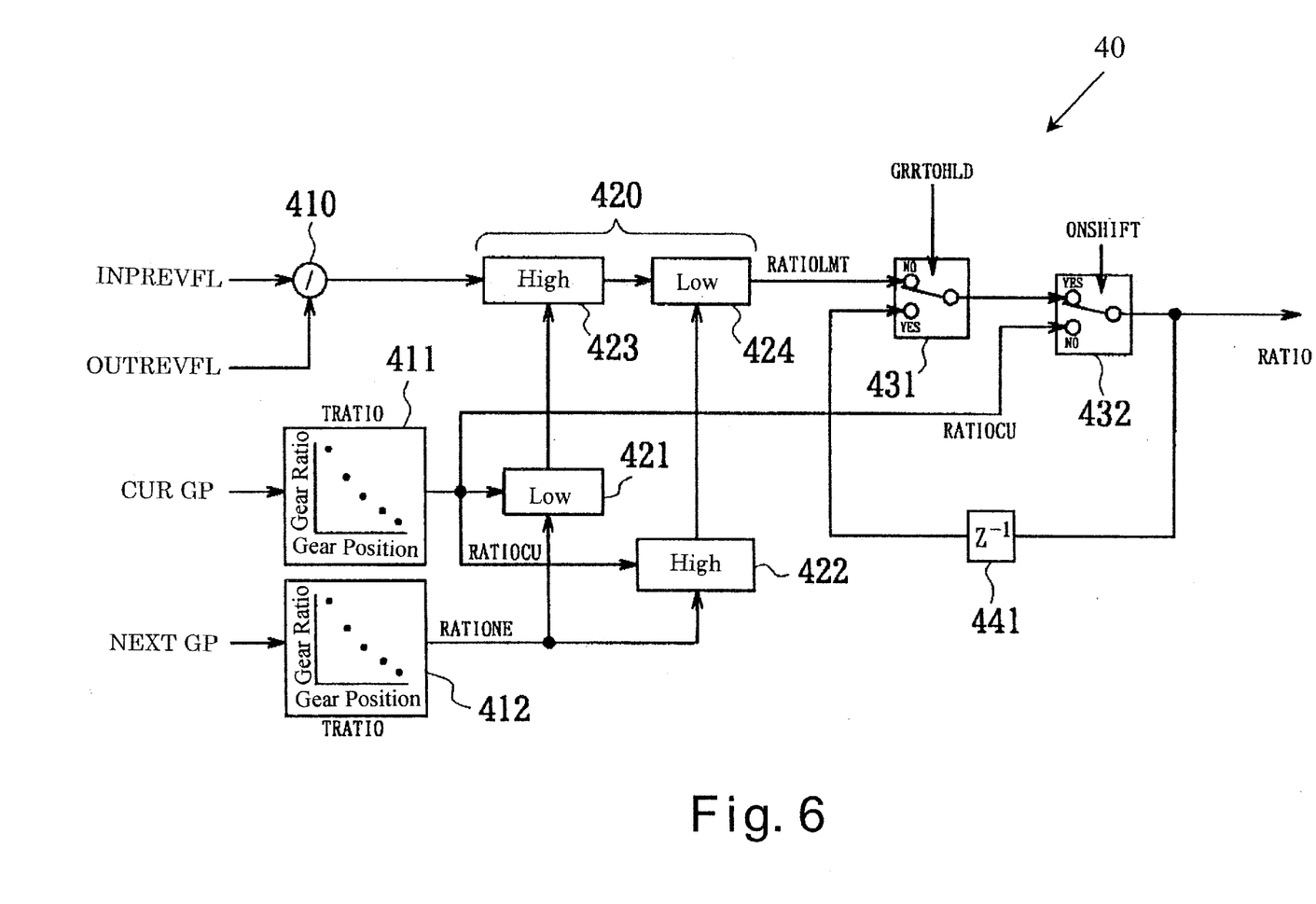
FIG. 6 is a block diagram showing the processes in computing the calculated engine torque gear ratio to be used in the configuration shown in FIG. 3.

FIG. 6 is a block diagram of the functions of the driving force control system 100 for computing the calculated engine torque gear ratio in accordance with the present embodiment. This particular driving force control system 100 is provided with a limiter process for establishing upper and lower limits on the value of the actual gear ratio to be used during shifting. The driving force control system 100 also includes a prohibition process that prohibits the use of the actual gear ratio even during shifting until the inertia phase starts. Such arrangement can be used as the calculated engine torque gear ratio processing section 40 shown in FIG. 3.

As shown in FIG. 6, the functions of the driving force control system 100 include a division block 410, a current gear ratio calculation block 411, a next gear ratio calculation block 412, a pair of select Low blocks 421 and 424, a pair of select High blocks 422 and 423, a pair of first and second gear ratio switching blocks 431 and 432, and a previous value application block 441.

The division block 410 receives the input shaft rotation INPREVFL (input rotational speed) and the output shaft rotation OUTREVFL (output rotational speed) from the respective sensors in order to determine the ratio INPREVFL/OUTREVFL, which is the actual gear ratio based on the input and output rotational speeds.

The current gear ratio calculation block 411 and the next gear ratio calculation block 412 determine the current gear ratio RATIOCU and the next gear ratio RATIONE using the gear ratio versus gear position data charts that are provided in advance (stored in memory) as shown in FIG. 6. The current gear ratio RATIOCU corresponds to the current gear position CURGP and the next gear ratio RATIONE corresponds to the next gear position NEXTGP.

Figure 7:
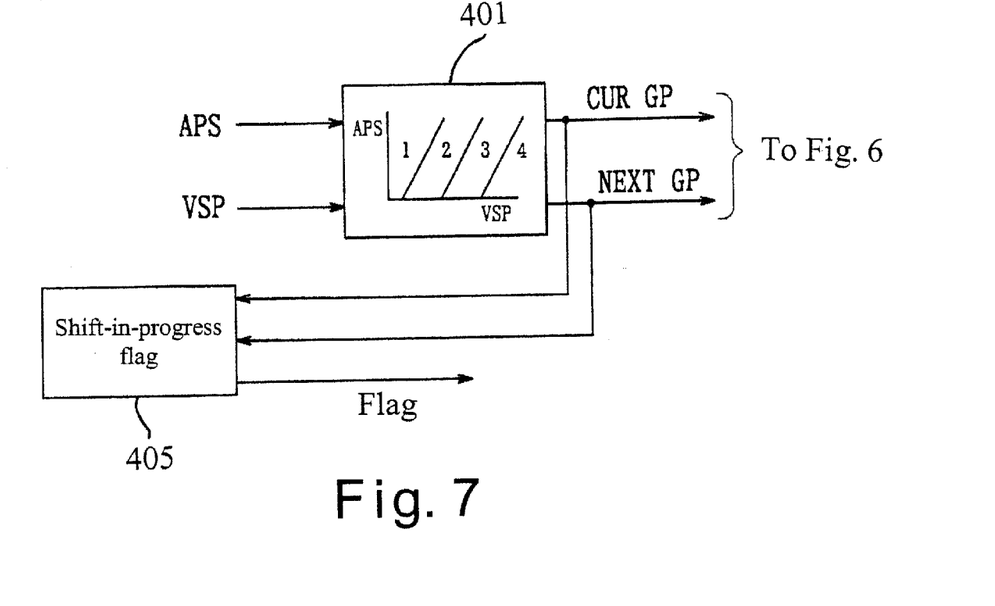
FIG. 7 is a block diagram showing an example of a gear position determining section for determining current gear position and next gear position used during the processes shown in FIG. 6.

The gear position information used by the current gear ratio calculation block 411 and the next gear ratio calculation block 412 can be obtained in a following manner. FIG. 7 shows a gear position determining section of the automatic transmission controller section (ATCU). The ATCU has a gear position selection block 401, which uses a shifting chart (e.g., a four-speed AT shifting map) that selects/determines the gear position based on the accelerator depression amount APS and the vehicle speed VSP. The aforementioned gear position information CURGP and NEXTGP are obtained from the gear position selection block 401. The ATCU is also provided with a shifting-in-progress flag setting block 405 that turns the shifting-in-progress flag ON and OFF using the aforementioned gear position information CURGP and NEXTGP.

Figure 8:
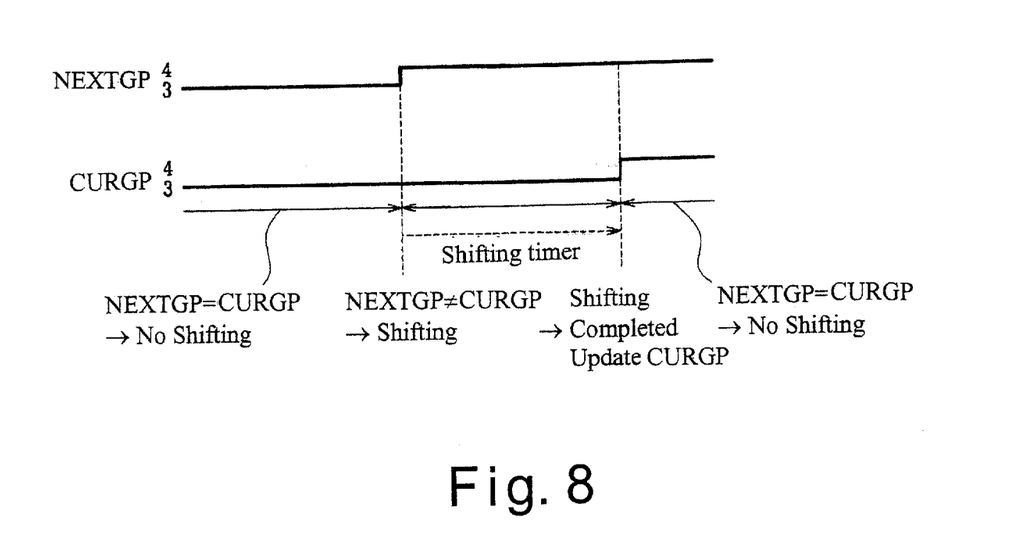
FIG. 8 shows an example of a configuration for determining whether or not a shifting operation is occurring during the processes shown in FIG. 7.

As an example, FIG. 8 illustrates an example of shifting determination using a shift from a 3rd gear position to a 4th gear position. More specifically, the shifting determination is described with respect to the periods before the shifting operation, during the shifting operation and after the shifting operation. As illustrated in FIG. 8, the line NEXTGP indicates the current operating point of the vehicle in the shifting chart, and therefore the current gear position 1st, 2nd, 3rd, or 4th, as determined by the operating conditions based on the accelerator pedal depression amount APS and vehicle speed VSP. Also in FIG. 8, the line CURGP indicates the current gear position. CURGP is changed to be the same as NEXTGP when shifting is completed. Also, the ATCU determines that a shifting should be made when NEXTGP differs from CURGP.

Still referring to FIG. 8, NEXTGP and CURGP both indicate that the transmission is in the 3rd gear before the shifting operation. A shifting operation is determined to be occurring when NEXTGP differs from CURGP. Also, when a shifting operation is determined to be occurring, a shifting-in-progress timer is started. The shifting-in-progress timer monitors the passing of a prescribed amount of time. When the prescribed amount of time has elapsed, the shifting operation is complete. Accordingly, the value of CURGP is changed to the 4th gear. Thus, after the shifting operation, NEXTGP and CURGP both indicate the 4th gear position.

On the other hand, if the ATCU is equipped with the shifting-in-progress flag setting block 405, the shifting-in-progress flag ONSHIFT, which turns ON while the shifting-in-progress timer is running, can be obtained from the shifting-in-progress flag setting block 405. The shifting-in-progress flag ONSHIFT can be used in the switching processing executed by the second gear ratio switching block 432 shown in FIG. 6.

As shown in FIG. 6, the computed values INPREVFL/OUTREVFL, RATIOCU, and RATIONE obtained from the processes executed by the division block 410, the current gear ratio calculation block 411 and the next gear ratio calculation block 412, respectively, are applied to the blocks 421 to 423. The value RATIOCU from the current gear ratio calculation block 411 is also used as one of the selectable gear ratio information inputs fed to the second gear ratio switching block 432.

Together with the block 424, the blocks 421–423 form a limiter 420 or an actual gear ratio limiter, which limits the actual gear ratio to be used as the engine toque calculation gear ratio during the shifting operation. More specifically, the limiter 420 limits the actual gear ratio to a value between the current gear ratio RATIOCU and the next gear ratio RATIONE. The function of the limiter 420 will explained below using, again, a shift from the 3rd gear position to the 4th gear position as an example.

In this example, the transmission 2 shifts from the 3rd gear position to the 4th gear position. The gear ratio of the 3rd gear position is 1.3, while the 4th gear position is 1.0. Thus, the value of the Current gear ratio RATIOCU is equal to 1.3: and the value of the Next gear ratio RATIONE is equal to 1.0. Consequently, the select Low output from the select Low block 421 is 1.0 and the select High output from the select High block 422 is 1.3.

During normal driving circumstances, in this example, the actual gear ratio (INPREVFL/OUTREVFL) calculated from the division block 410 has a value between 1.3 and 1.0, such as 1.2 for example. Then, the select High output from the select High block 423 is 1.2 and the select Low output from the select Low block 424 is 1.2. The output from the select Low block 424 is the output of the actual gear ratio from the limiter 420, which will be hereinafter referred to as a post-limiter gear ratio RATIOLMT.

As a result, during normal circumstances, the select Low output from the select Low block 424, i.e., the post-limiter gear ration, RATIOLMT, is the gear ratio that matches the gear ratio INPREVFL/OUTREVFL at that point in time. Therefore, this is the value of 1.2 used as the actual gear ratio by the first and second gear ratio switching blocks 431 and 432 as seen in FIG. 6.

The function of the upper limit limiter of this example will now be discussed. If the calculated value of INPREVFL/OUTREVFL outputted from the division block 410 exceeds the proper value range (between 1.0 and 1.3 in this example), and becomes for example 1.5, due to a trouble in the input rotational speed sensor or the vehicle speed sensor, or some other abnormality, then the select High output from the select High block 423 will be 1.5 and the select Low output (i.e., RATIONLMT) from the select Low block 424 will be 1.3.

Thus, even though the calculated value of INPREVFL/OUTREVFL is 1.5, the upper limit limiter, which is determined to be 1.3 by the next gear ratio value RATIONE, functions to limit the post-limiter gear ratio RATIOLMT to the same value of 1.3. This value of 1.3 is then used in the subsequent processing blocks as seen in FIG. 6.

The function of the lower limit limiter of this example will now be discussed. In the illustrated embodiment, the value of INPREVFL/OUTREVFL outputted from the division block 410 can fall short of the proper value range and becomes, for example 0.5, due to a sensor trouble or some other abnormality. Then, the select High output from the select High block 423 will be 1.0 and the select Low output (RATIOLMT) from the select Low block 424 will also be 1.0.

Thus, even though the calculated value of INPREVFL/OUTREVFL is 0.5, the lower limit limiter, which is determined to be 1.0 by the current gear ratio value RATIOCU, functions to limit the post-limiter gear ratio RATIOLMT to the same value of 1.0. This value of 1.0 is then used in the subsequent processing blocks as seen in FIG. 6.

In the aforementioned manner, the upper and lower limits are imposed on the calculated engine torque gear ratio when the calculated engine torque gear ratio is calculated based on the actual gear ratio. Although the processing was explained based on a case where the transmission is upshifted, similar limits can be imposed in the same manner for a downshifting operation. In other words, as explained above, the calculated actual gear ratio or RATIOLMT obtained from the select Low block 424 can be limited to a value between the current gear ratio RATIOCU and the next gear ratio RATIONE for a downshifting operation.

As shown in FIG. 6 of this embodiment, the post-limiter gear ratio RATIOLMT can be used as one of the selectable gear ratio information inputs fed to the first gear ratio switching block 431. More specifically, the RATIOLMT is fed to the NO side of the first gear ratio switching block 431. The switching action of the first gear ratio switching block 431 is controlled by a gear ratio computation prohibition flag GPRTOHLD. The NO side of the first gear ratio switching block 431 indicates that the computation is not prohibited.

The gear ratio information obtained as an output from the first gear ratio switching block 431 is used as one of the selectable gear ratio information inputs fed to the second gear ratio switching block 432. More specifically, the output from the first gear ratio switching block 431 is fed to the YES side of the second gear ratio switching block 432. The switching action is controlled by the shifting-in-progress flag ONSHIFT previously mentioned. The YES side indicates that a shifting operation is occurring. On the other hand, the current gear ratio RATIOCU from the current gear ratio calculation block 411 is used as the other selectable gear ratio information input that is fed to the NO side of the second gear ratio switching block 432. Furthermore, as shown in FIG. 6, the gear ratio RATIO obtained as an output from the second gear ratio switching block 432 is used as the other selectable gear ratio information input that is fed into the YES side or prohibition side of the first gear ratio switching block 431 via the previous value application block 441.

As shown in FIG. 6, the driving control system 100 of this embodiment uses the gear ratio RATIO, which is the final gear ratio information obtained from the second gear ratio switching block 432, as the calculated engine torque gear ratio for use in calculation of the target engine torque Te*. In other words, the gear ratio RATIO is the gear ratio information that should be obtained from the processing section 40 in FIG. 3 during the shifting operation.

The second gear ratio switching block 432 switches its position based on the value of shifting-in-progress flag ONSHIFT, which turns ON for a prescribed amount of time starting when shifting is detected according to the shifting chart. Thus, when the shifting-in-progress flag is ON, the second gear ratio switching block 432 selects the YES position as shown in FIG. 6. Thus, the actual gear ratio, which is the post-limiter actual gear ratio RATIOLMT from the select Low block 424 calculated based on the input and output rotational speeds INPREVFL and OUTREVFL, can be used as the aforementioned gear ratio RATIO. Otherwise, the NO position is selected in the second gear ratio switching block 432. On the other hand, the first gear ratio switching block 431 switches its position based on the value of gear ratio computation prohibition flag GPRTOHLD. Thus, even during the shifting operation, the gear ratio determined by the gear position can be used instead of the actual gear ratio RATIOLMT calculated based on the input and output rotational speeds until a change in the gear ratio occurs due to the start of the inertia phase.

The driving force control system 100 can be designed to prevent the actual gear ratio from being used until the inertia phase starts. Specifically, the driving force control system 100 can be designed so that the first gear ratio switching block 431 selects the YES side (the opposite side from the one shown in FIG. 6) when the gear ratio computation prohibition flag GPRTOHLD is ON (prohibition activated), and the NO side (the side shown in FIG. 6) when the flag is OFF (prohibition canceled). The ON/OFF operation of the gear ratio computation prohibition flag GPRTOHLD can be set by, for example, monitoring the gear ratio INPREVFL/OUTREVFL before the gear ratio INPREVFL/OUTREVFL enters the actual gear ratio limiter 420. Thus, the use of the actual gear ratio is properly prohibited until a change in the gear ratio INPREVFL/OUTREVFL occurs due to the start of the inertia phase.

Thus, when a shifting operation is not occurring and the second gear ratio switching block 432 is selecting the NO side (the opposite side from that shown in FIG. 6), the current gear ratio RATIOCU from the current gear ratio calculation block 411 is selected as the output (RATIO) from the second gear ratio switching block 432. This gear ratio RATIO is used as the calculated engine torque gear ratio from the engine torque gear ratio processing section 40 shown in FIG. 3. While the transmission 2 is not shifting, the engine torque control can be executed by applying the engine torque gear ratio determined by the gear position to calculate the target torque Te*. On the other hand, when the second gear ratio switching block 432 selects the YES position (as shown in FIG. 6) in response to the shifting-in-progress flag ONSHIFT, the actual gear ratio RATIOLMT is used as the output RATIO from the second gear ratio switching block 432. As previously mentioned, the actual gear ratio RATIOLMT is calculated based on the input and output rotational speeds INPREVFL and OUTREVFL, but limited in some cases by the limiter 420. When this actual gear ratio RATIOLMT is used, RATIOLMT is used to calculate the target engine torque Te*.

Furthermore, when all else is the same as described above, except that the first gear ratio switching block 431 has selected the YES side because the gear ratio computation prohibition flag GPRTOHLD indicates execution of prohibition control, then the gear ratio value from the previous cycle, instead of the aforementioned actual gear ratio RATIOLMT, is fed to the second gear ratio switching block 432 via previous value application block 441. More specifically, once the YES side is selected in first gear ratio switching block 431, then the output from the second gear ratio switching block 432 continues to output the prior RATIO since the prior RATIO is being circulated through the previous value application block 441, the first gear ratio switching block 431, and the second gear ratio switching block 432. As a result, even if the second gear ratio switching block 432 switches from the NO side (No shifting occurring) to the YES side (shifting occurring), the gear ratio RATIO to be outputted from the second gear ratio switching block 432 will maintain the same value as before the switch of the side (i.e., before shifting occurred) if the YES side is selected in the first gear ratio switching block 431. More specifically, the gear ratio RATIO remains to be the current gear ratio RATIOCU from block 441. Therefore, even during shifting, the gear ratio determined by the gear position RATIOCU can be utilized in the calculation of the target engine torque Te* until the gear ratio computation prohibition flag GPRTOHLD cancels prohibition and the first gear ratio switching block 431 selects the NO position as shown in FIG. 6. From that point on, the actual gear ratio RATIOLMT can be used in the target engine torque Te* calculation and subsequent processing to control the engine torque.

When the inertia phase initially starts, the balance between the clutch capacity of the frictional elements of the transmission and the input torque is easily disrupted, making the clutch unstable. When the engine torque is changed under such conditions, problems such as clutch slippage and sudden clutch engagement occur easily. As a result, the progress of the shifting operation may be delayed, or the shifting shock may be worsened. The control operations described above is an effective way of avoiding such problems, because the engine torque is not changed when the inertia phase first starts until the inertia phase has progressed to a certain degree. In this manner, worsening of the shifting shock and delaying of the progress of the change can be prevented.

Thus, the driving force control system 100 of the present invention can achieve a target driving force without causing a delay in shifting operation or a shifting shock, because a change in the engine torque does not occur until the inertia phase progresses and the shifting operation is stabilized. Also, the driving force control system 100 of the present invention allows a gradual change in the engine torque. Therefore, the target driving force can be achieved more securely. More specifically, when the target engine torque Te* is calculated using the target driving torque Tt* established by the calculating section 31 and the calculated engine torque gear ratio as seen in FIG. 3, the value of the calculated engine torque gear ratio RATIO used in the target engine torque Te* calculation can be set to the gear ratio RATIOCU, which is the gear ratio of the gear position when shifting is not occurring. Then, when shifting is occurring, the target engine torque Te* is calculated using the target driving torque Tt* and the actual gear ratio calculated based on the input and output rotational speeds INPREVFL and OUTREVFL. Below, the functions and effects of this control are described in further detail with reference to FIGS. 9 and 10.

As discussed earlier, in the conventional technology, the shifting operation is controlled so that the engine torque is changed at the end of the shifting operation to avoid worsened shifting shock and other problems that would have resulted if the engine torque were changed at the start of actual shifting. Accordingly, a dip in the output torque due to the delayed increase in engine torque right after the engine torque is increased. Conversely, in FIG. 9, this dip does not occur in the present invention. In this case, the actual gear ratio based on INPREVFL/OUTREVFL is used during the shifting operation to calculate the target engine torque Te* based on the target driving force Tt*. In response to this actual gear ratio, the target engine torque is varied gradually. As a result, the aforementioned problems can be eliminated. In other words, both the shifting shock and the dip in driving force can be eliminated in a satisfactory manner.

Figure 9:
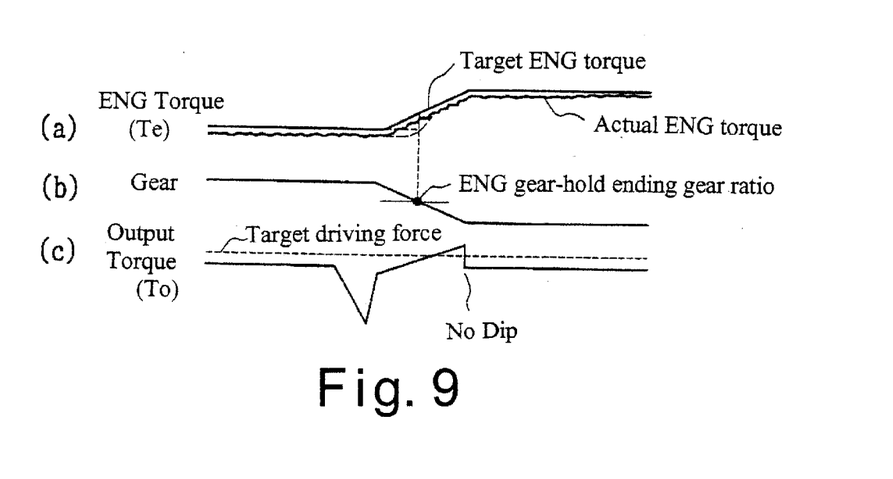
FIG. 9 is a timing chart for describing an example of how a driving force control in accordance with the embodiment of the present invention functions during an upshifting operation.

Although FIG. 9 illustrates a case where the transmission shifts to a higher gear position, the same benefits can be similarly obtained during a downshifting operation. FIG. 9 also illustrates a situation where, even during a shifting operation, the gear ratio determined by the gear position is used instead of the actual gear ratio in the calculation of the target engine torque until a change in the gear ratio INPREVFL/OUTREVFL occurs due to the start of the inertia phase. In FIG. 9, the broken line (a) of FIG. 9 illustrates a situation where the gear ratio RATIOCU determined by the gear position is used instead of the actual gear ratio in the calculation of the target engine torque Te* until the gear ratio INPREVFL/OUTREVFL reaches a gear ratio that corresponds to an engine side gear-hold ending gear ratio. The present invention can be embodied in this manner as well.

Furthermore, with the above described controls executed by the driving force control system 100 of the present invention, the actual gear ratio in the calculation of the target engine torque can be used only for the minimum necessary duration of time.

Actual gear ratio is subject to fluctuations due to the driver's acceleration and braking operations, as well as release of one-way clutch and sensor troubles. Therefore, if the actual gear ratio determined based on the input and output rotational speeds is used constantly, regardless of whether or not a shifting operation is in progress, the calculated engine torque gear ratio to be used in calculation of the target engine torque Te* will be unstable. With the driving force control system 100 of the present invention, such problem can be avoided because use of the actual gear ratio which is based on INPREVFL/OUTREVFL is limited to the minimum necessary duration of time, and the gear ratio RATIOCU determined by the gear position is used otherwise. For instance, if the engine torque increases suddenly while shifting is not occurring, a shock from the engine torque increase would be greater if the actual gear ratio is utilized in calculation of the target engine torque Te*. However, such worsening of the shock to the vehicle can be avoided because the driving force control system 100 of the present invention limits use of the actual gear ratio to a minimum, and instead uses the gear ratio determined by the gear position when the transmission is not shifting.

Therefore, by minimizing the duration of time in which the actual gear ratio is utilized in calculation of the target engine torque Te*, it is possible to reduce potential shocks from the fluctuations of the actual engine torque. During a shifting operation, even if the engine torque increases suddenly, the increase will not be fully transmitted to the output torque To because the clutch, which is a frictional element of transmission 2, slips. More specifically, input torque that exceeds the clutching capacity of the frictional elements will not be transmitted. Instead, the excess of the input torque will only result in increased slippage. Thus, if a sudden increase in the engine torque occurs during shifting, although a shock occurs momentarily, the shock is absorbed by the slippage of the clutch.

Furthermore, by limiting the calculated value of the actual gear ratio to be used for calculating the target engine torque Te* to a value that lies between the current gear ratio RATIOCU and the next gear ratio RATIONE, abnormal increases and decreases in the output torque during a shifting operation can be prevented more effectively.

Figure 10:
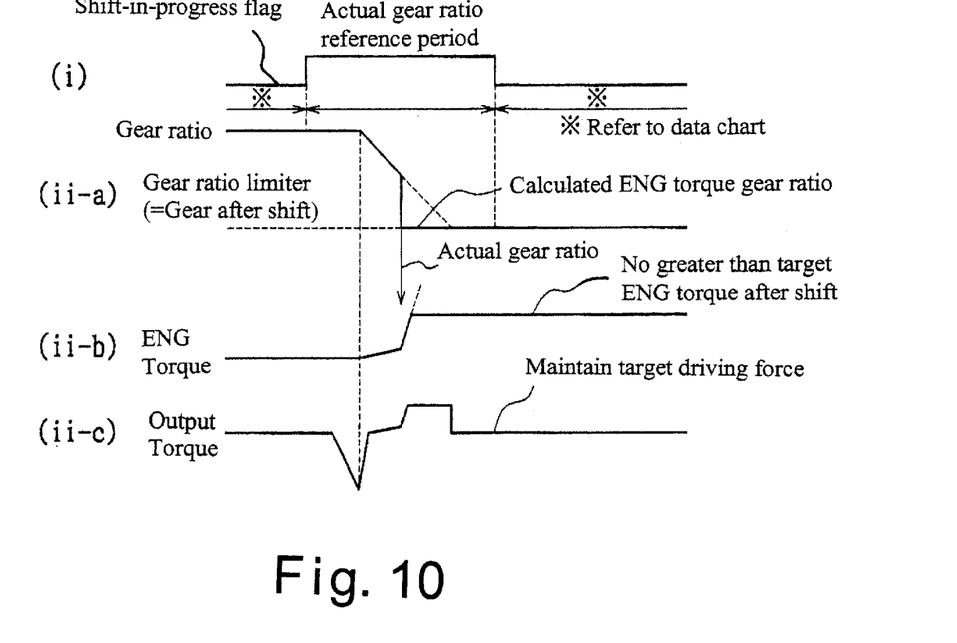
FIG. 10 is a timing chart for describing the limiter function of the driving force control system in accordance with the embodiment of the present invention.

Referring now to FIG. 10, the outputs of various parameters of the driving force control system 100 are shown in accordance with the embodiment of the present invention during a shifting operation. As mentioned above, the driving force control system 100 has the gear ratio limiter 420, which limits the value of the actual gear ration that was calculated based on INPREVFL/OUTPREVFL. The line (i) in FIG. 10 shows the ON period and the OFF period of the shifting-in-progress flag ONSHIFT. During the ON period, the target engine torque Te* is calculated based on the actual gear ratio. During the OFF period, the target engine torque Te* is calculated by referring to the predetermined gear ratio data chart. The lines (ii-a), (ii-b), and (ii-c) in FIG. 10 show the calculated engine torque gear ratio RATIO, the engine torque, and the output torque, respectively.

Referring to FIG. 10, the line (i) in FIG. 10 indicates changes in the gear ratio computation prohibition flag GPRTOHLD. Referring to the line (ii-a) in FIG. 10, even if the gear ratio INPREVFL/OUTREVFL decreases suddenly as indicated by the arrow during shifting, the calculated engine torque gear ratio is maintained within the range allowed by the actual gear ratio limiter 420. Consequently, the calculated engine torque does not exceed the target engine torque Te* as seen by the line (ii-b) in FIG. 10 after a shifting operation. Accordingly, the outputted engine torque can be held to the target driving force Tt*, as seen by the line (ii-c) in FIG. 10.

Therefore, the present invention solves the problems due to abnormal increases and decreases in output torque by: (1) referring to the actual gear ratio only during shifting, and otherwise referring to the predetermined gear ratio data while ignoring the actual gear ratio; and/or (2) using an actual gear ratio limiter to impose upper and lower limits, which are the constant gear ratios used before and after a shifting operation, on the actual gear ratio during shifting.

The embodiment of the present invention is not limited to the embodiments described above. For example, the driving force control system 100 illustrated in FIG. 6 includes a limiting function wherein the actual gear ratio limiter 420 limits the calculated engine torque gear ratio that is calculated based on the input and output rotational speeds. Further, the driving force control system 100 also includes an application prohibition process that prohibits application of the actual gear ratio in the calculation of the target engine torque Te* under certain circumstances as determined by the gear ratio switching process 431 based on the gear ratio computation prohibition flag. However, the present invention can be embodied without including such limiter process and application prohibition process.

Although FIG. 6 illustrates using both of these functions together, it is also acceptable to use only one of the limiter function and application prohibition function. For example, the driving force control system of the present invention can be implemented with only the limiting function. In that case, the functional structural view equivalent of FIG. 6 should omit the first gear ratio switching block 431 and the previous value application block 441.

The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms should be construed as including a deviation of ±5% of the modified term if this would not negate the meaning of the word it modifies.

This application claims priority to Japanese Patent Application No. 2000-170382. The entire disclosure of Japanese Patent Application No. 2000-170382 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A driving force control system for a vehicle with a step-type automatic transmission, the driving force control system comprising:

a shifting operating section configured to operate a shifting operation to shift a current gear position to a next gear position of the transmission;

a target driving force calculating section configured to calculate a target driving force;

a gear ratio determining section configured to determine a calculated engine torque gear ratio based on the current gear position before the shifting operation, and based on an actual gear ratio calculated from input and output rotational speeds of the transmission at least at one point in time during the shifting operation; and a target engine force calculating section configured to calculate a target engine torque based on the target driving force and the calculated engine torque gear ratio.

2. A driving force control system as set forth in claim 1, wherein the gear ratio determining section is configured such that the actual gear ratio used for calculating the target engine torque is limited to a value that lies between a gear ratio of the current gear position from which the transmission is shifted and a gear ratio of a next gear position to which the transmission is shifted.

3. A driving force control system as set forth in claim 2, wherein
the gear ratio determining section is configured to use the current gear position for the calculated engine torque gear ratio during a shifting operation until an inertia phase of the shifting operation starts.

4. A driving force control system as set forth in claim 1, wherein
the gear ratio determining section is configured to use the current gear position for the calculated engine torque gear ratio during a shifting operation until an inertia phase of the shifting operation starts.

5. A driving force control system for a vehicle equipped with a step-type automatic transmission, the driving force control system comprising:

shifting operating means for operating a shifting operation to shift a current gear position to a next gear position of the transmission;

target driving force calculating means for calculating a target driving force;

gear ratio determining means for determining a calculated engine torque gear ratio based on the current gear position before the shifting operation, and based on an actual gear ratio calculated from input and output rotational speeds of the transmission at least at one point in time during the shifting operation; and target engine force calculating means for calculating a target engine torque based on the target driving force and the calculated engine torque gear ratio.

6. A driving force control system as set forth in claim 5, wherein
the gear ratio determining means limits the calculated actual gear ratio used for calculating the target engine torque to a value that lies between a gear ratio of the current gear position from which the transmission is shifted and a gear ratio of a next gear position to which the transmission is shifted.

7. A driving force control system as set forth in claim 6, wherein, the gear ratio determining means uses the current gear position for the calculated engine torque gear ratio during shifting until an inertia phase of the shifting starts.

8. A driving force control system as set forth in claim 5, wherein, the gear ratio determining means uses the current gear position for the calculated engine torque gear ratio during shifting until an inertia phase of the shifting starts.

* * * * *